United States Patent
Walker et al.

[11] Patent Number: 5,950,351
[45] Date of Patent: Sep. 14, 1999

[54] FISHING LURE

[76] Inventors: Larry M. Walker, P.O. Box 312;
David M. Stucki, 456 E. 100 S., both of St. George, Utah 84770

[21] Appl. No.: 09/024,155

[22] Filed: Feb. 17, 1998

[51] Int. Cl.$^6$ .................................................. A01K 83/06
[52] U.S. Cl. ............................................ 43/44.2; 43/44.4
[58] Field of Search ........................... 43/42, 44.2, 44.4, 43/44.8, 42.32

[56] References Cited

U.S. PATENT DOCUMENTS

| | | | |
|---|---|---|---|
| 62,042 | 2/1867 | Lee | 43/43.16 |
| 103,645 | 5/1870 | Muscroft | 43/43.16 |
| D. 286,317 | 10/1986 | Orlick et al. | D22/127 |
| 675,321 | 5/1901 | Brownfield | 43/43.16 |
| 772,333 | 10/1904 | Biersach | 43/43.16 |
| 2,196,376 | 4/1940 | Anderson | 43/40 |
| 2,590,558 | 3/1952 | Mickelson | 43/44.83 |
| 2,636,306 | 4/1953 | Sokolik | 43/44.4 |
| 2,700,242 | 1/1955 | Porth | 43/44.4 |
| 2,977,710 | 4/1961 | Stambaugh | 43/44.2 |
| 3,217,443 | 11/1965 | Goodman | 43/42.51 |
| 3,293,790 | 12/1966 | Konomos | 43/44.2 |
| 3,396,485 | 8/1968 | Kuntz | 43/44.8 |
| 3,760,525 | 9/1973 | Daughtry | 43/44.2 |
| 3,935,659 | 2/1976 | McCallum | 43/17.6 |
| 4,803,793 | 2/1989 | Schellenberg, III | 43/42.33 |
| 4,837,964 | 6/1989 | Aleckson | 43/4 |
| 5,113,616 | 5/1992 | McManus | 43/321 |
| 5,218,780 | 6/1993 | Jacobsen | 43/44.4 |
| 5,274,947 | 1/1994 | Griffiths | 43/44.2 |
| 5,333,407 | 8/1994 | Merritt | 43/44.4 |

FOREIGN PATENT DOCUMENTS

| | | | |
|---|---|---|---|
| 369346 | 11/1906 | France | 43/44.2 |
| 852064 | 1/1940 | France | 43/44.2 |
| 1133395 | 11/1956 | France . | |
| 2336702 | 2/1975 | Germany | 43/44.2 |
| 99729 | 8/1940 | Sweden | 43/44.2 |
| 6810 | 4/1900 | United Kingdom | 43/44.2 |
| 666742 | 2/1950 | United Kingdom | 43/44.2 |

*Primary Examiner*—Michael J. Carone
*Assistant Examiner*—Fredrick T. French, III

[57] ABSTRACT

An elongated wire shank has a first end and a second end. The first end has a first eyelet formed thereon, and the second end has a second eyelet formed thereon. The first eyelet is adapted for attachment to a fishing line. A spring is disposed longitudinally on the shank and surrounds the shank, such that the second end of the shank extends beyond the spring. A ring is connected to the second eyelet such that the ring hangs freely from the second eyelet. A treble hook having three legs is attached to the ring such that the treble hook hangs freely from the ring. The spring is fluorescently coated, and the three legs are devoid of fluorescent coating.

8 Claims, 4 Drawing Sheets

FISHING LURE

BACKGROUND OF THE INVENTION

1. Field of the Invention

The present invention relates to fishing equipment, particularly to hooks and lures.

2. Description of the Related Art

Cheese hooks are popular among fishermen for catching trout and other fish. This device consists of a treble hook with a spring surrounding its shank portion. To use the cheese hook, cheese or trout bait is smeared onto the spring and over the treble hook. Cheese hooks have been found to lose their effectiveness if the hook and spring are not entirely covered.

A known trout bait for use with cheese hooks is BERKELY (TM) POWER BAIT (TM) Trout Bait Fishing Formula, Catalog No. BTBC2, U.S. Pat. No. 5,089,277. According to the label, this product is made from 92% biodegradable, 8% non-bio-degradable micro-spheres formed from naturally occurring silica. Other trout baits are possible.

The cheese hook is fished on the bottom of a lake or stream. The cheese or trout bait is often bumped off of the cheese hook by rocks, weeds, and other objects on the bottom of the lake or stream. When this occurs, the cheese hook loses its effectiveness because the hook and spring are no longer entirely covered.

The fisherman must be alert to when the fish hits the cheese hook, because the fisherman must then pull on the line hard enough for the hooks to work their way outward through the cheese or trout bait and into the fish's mouth or belly. Many times, a fish will notice the hook through the cheese or trout bait before it has had a chance to penetrate the cheese or trout bait, at which time the fish will drop the hook or spit it out.

Cheese hooks are not particularly appropriate for trolling, because of the various surface objects which can bump the cheese hook, causing the cheese or trout bait to fall off.

What is needed is a hook and lure which works effectively when only the spring is coated, to ensure quicker and surer penetration of the hook into the fish. Such a device should be more able to retain the cheese or trout bait thereon when it is bumped, even when the device is trolled. Trolling will increase the effectiveness of the device, because fish will be attracted not only to the color and smell of the cheese or trout bait, but also to the movement of the device through the water.

SUMMARY OF THE INVENTION

The fishing device of the present invention includes an elongated wire shank having a first end and a second end. The first end has a first eyelet formed thereon, and the second end has a second eyelet formed thereon. The first eyelet is adapted for attachment to a fishing line. A spring is disposed longitudinally on the shank and surrounds the shank, such that the second end of the shank extends beyond the spring. A ring is connected to the second eyelet such that the ring hangs freely from the second eyelet. A treble hook having three legs is attached to the ring such that the treble hook hangs freely from the ring. The spring is fluorescently coated, and the three legs are devoid of fluorescent coating.

Because the treble hook hangs freely from the ring, and the ring hangs freely from the second eyelet which is formed on the second end of the shank, which extends beyond the spring, the treble hook itself is far enough away from the spring that it does not tend to visually obstruct the spring in any way. Because the spring is not visually obstructed by the treble hook, any trout bait or cheese spread onto the spring will not be visually obstructed by the treble hook. For this reason, it is not necessary to hide the treble hook from the fish by coating the treble hook itself with trout bait or cheese. The fish have been found to be sufficiently attracted to the device, even though the treble hook itself is not coated with trout bait or cheese. In contrast, it has been found that conventional cheese hooks of the prior art must have the complete treble hook coated in order to be effective.

Furthermore, because the treble hook hangs freely from the shank, it has been found that the cheese or trout bait is not easily bumped off of the spring when the treble hook bumps into debris, rocks or plants on the surface or bottom of a body of water. In contrast, in cheese hooks of the prior art, the shank is an integral part of the treble hook, and the spring surrounds the shank. When the legs of the treble hook bump into debris, rocks and plants on the surface or at the bottom of a body of water, the cheese or trout bait is easily bumped off.

Still further features and advantages will become apparent from the ensuing description and drawings.

DETAILED DESCRIPTION

Figure 1:
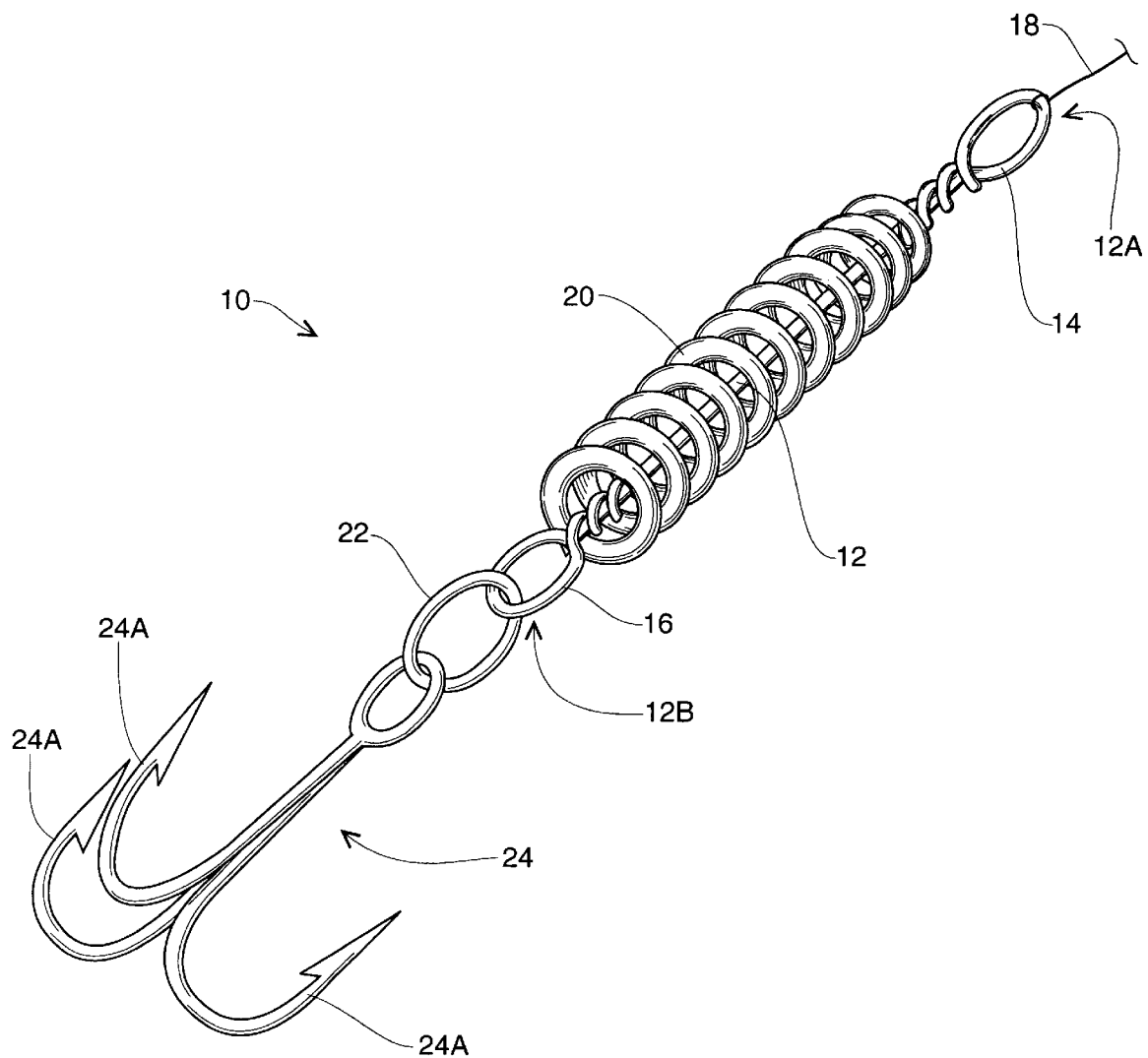
FIG. 1 is a perspective view of the fishing device of the present invention.
Figure 2:
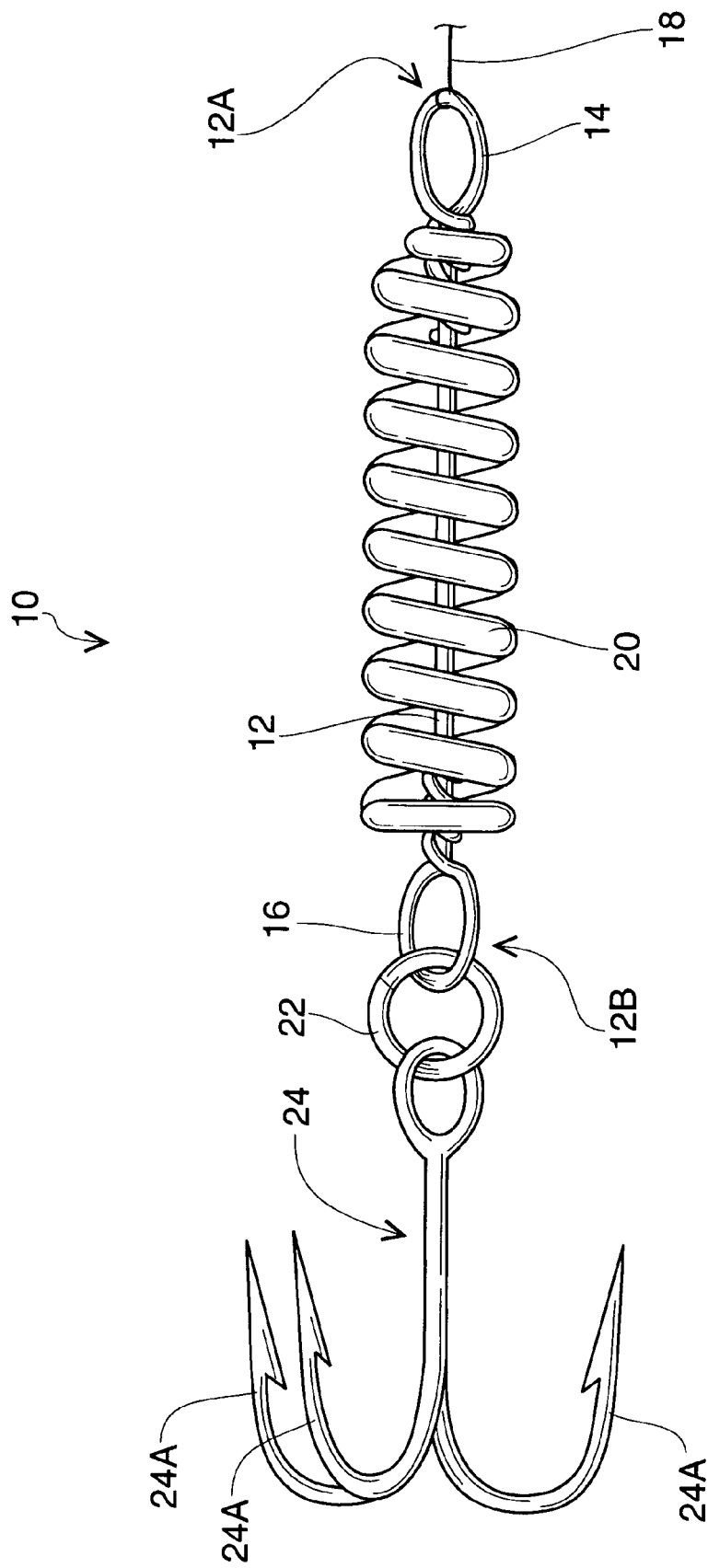
FIG. 2 is an elevational view of the fishing device.

FIG. 1 is a perspective view of a fishing device 10 of the present invention. FIG. 2 is an elevational view of the fishing device 10. Referring to FIGS. 1 and 2, the fishing device 10 includes an elongated wire shank 12 having a first end 12A and a second end 12B. The first end 12A is twisted to form a first eyelet 14, and the second end 12B is twisted to form a second eyelet 16. The first eyelet 14 is adapted for attachment to a fishing line 18, which extends to a fishing rod (not shown).

The fishing device 10 may be used for bottom fishing, or may be trolled, or cast and reeled back along the surface of the water. When the device 10 is trolled or cast and reeled, a spoon (not shown) or spinner (not shown) may be attached in front of the fishing device 10 in a known manner to further attract fish.

A spring 20 is disposed longitudinally on the shank 12 and surrounds the shank 12, such that the second end 12B of the shank 12 extends beyond the spring 20. A ring 22 is connected to the second eyelet 16 such that the ring 22 hangs freely from the second eyelet 16. A treble hook 24 having three legs 24A is attached to the ring 22 such that the treble hook 24 hangs freely from the ring 22.

Figure 2A:
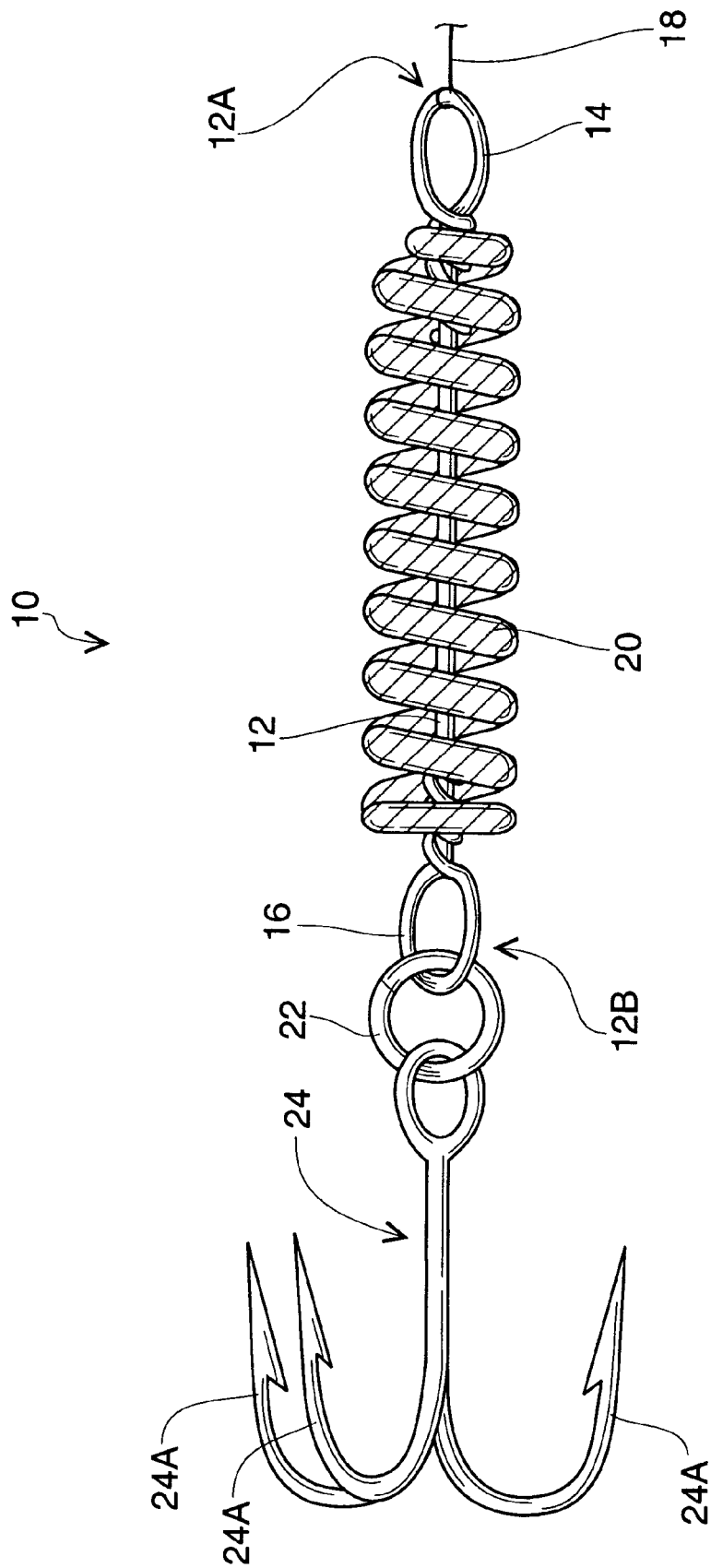
FIG. 2A is an elevational view of the fishing device, which the spring shown colored green.

FIG. 2A is similar to FIG. 2, except the spring 20 is shown coated with a green. fluorescent paint. Although green is indicated, any appropriate bright color is acceptable. It has been found that coloring increases the effectiveness of the device 10, although it is not entirely necessary. If the three legs 24A are devoid of fluorescent coating, as shown, than the fish is less likely to notice the treble hook 24, and thus less likely to be scared away from the device 10.

Figure 3:
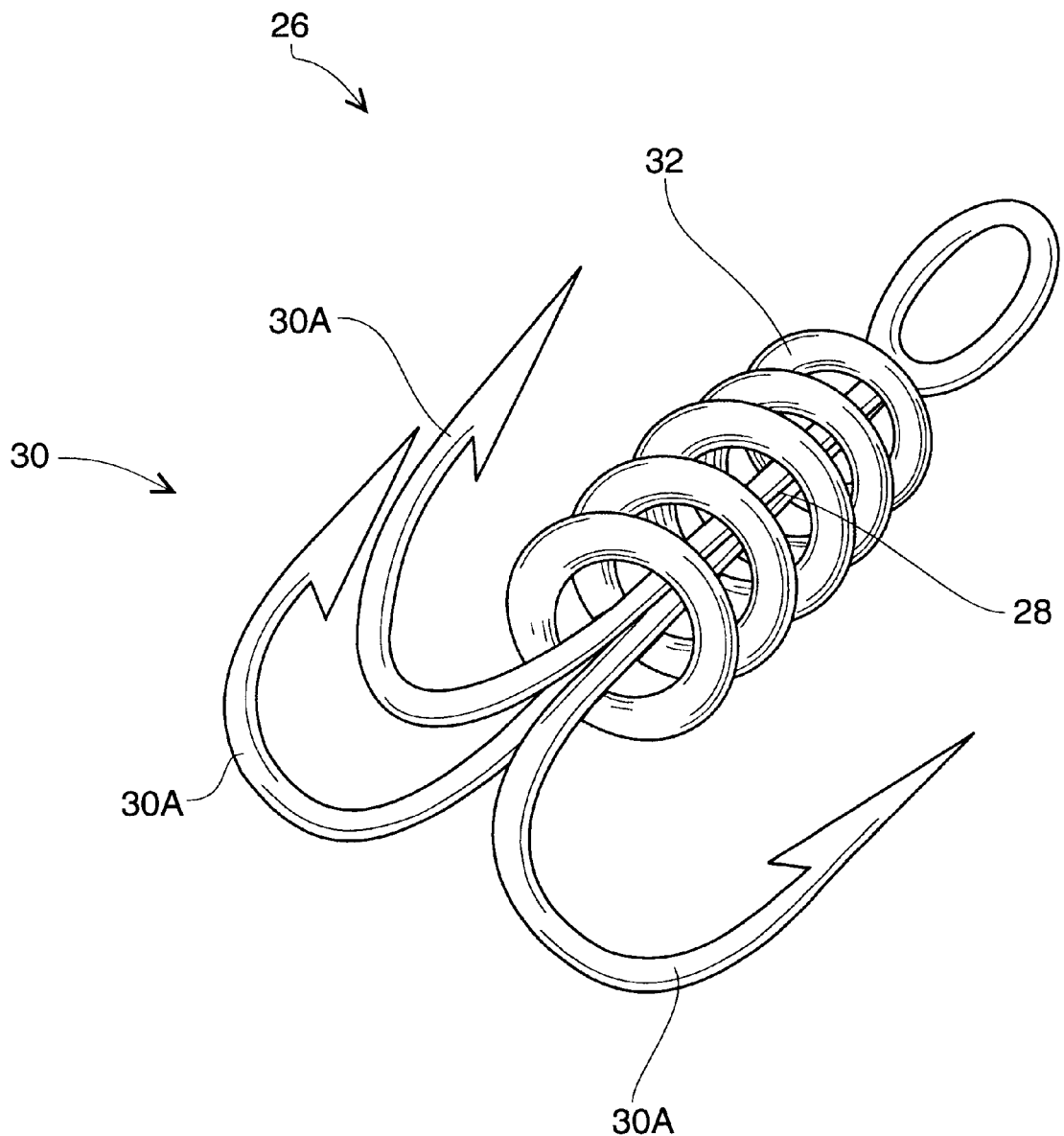
FIG. 3 is a perspective view of a cheese hook of the prior art.

FIG. 3 is an elevational view of a cheese hook 26 of the prior art, having a treble hook 30 with an integral shank 28, and a spring 32 surrounding the shank 28. The legs 30A of the treble hook 30 extend upward along the spring 32, visually covering a portion of the spring 32. This figure is provided for comparison to the present invention, to help clarify the structural differences and advantages of the present invention over the prior art.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A fishing device comprising:
   a. an elongated shank having a first end and a second end;
   b. the first end of the shank adapted for attachment to a fishing line;
   c. a spring disposed longitudinally on the shank and surrounding the shank;
   d. a hook attached to the second end such that the hook hangs freely from the second end;
   e. the spring being not cone shaped; and
   f. the spring having coils which are spaced apart from each other.

2. The fishing device of claim 1, wherein the hook comprises a central shank and at least one curved leg having a pointed end, and wherein no portion of the hook turns back over any portion of the spring when the central shank of the hook and the elongated shank share a common central longitudinal axis.

3. The fishing device of claim 1, wherein the spring measured along a straight central longitudinal axis thereof is longer than the hook measured along a straight central longitudinal axis of a central shank of the hook.

4. The fishing device of claim 2, wherein the spring measured along a straight central longitudinal axis thereof is longer than the hook measured along a straight central longitudinal axis of the central shank of the hook.

5. A fishing device comprising:
   a. an elongated shank having a first end and a second end;
   b. the first end of the shank adapted for attachment to a fishing line;
   c. a spring disposed longitudinally on the shank and surrounding the shank; and
   d. a hook attached to the second end such that the hook hangs freely from the second end;
   e. the spring being not cone shaped;
   f. the spring having coils which are spaced apart from each other;
   g. the hook having a central shank and at least one curved leg having a pointed end;
   h. no portion of the hook turning back over any portion of the spring when the central shank of the hook and the elongated shank share a common central longitudinal axis; and
   h. the spring measured along a straight central longitudinal axis thereof being at least as long as the hook measured along a straight central longitudinal axis of the central shank of the hook.

6. The fishing device of claim 5, wherein the hook is a treble hook.

7. A fishing device comprising:
   a. an elongated wire shank having a first end and a second end;
   b. the first end having a first eyelet formed thereon, and the second end having a second eyelet formed thereon;
   c. the first eyelet adapted for attachment to a fishing line;
   d. a spring disposed longitudinally on the shank and surrounding the shank, such that the second end of the shank extends beyond the spring;
   e. a ring connected to the second eyelet such that the ring hangs freely from the second eyelet;
   f. a treble hook attached to the ring such that the treble hook hangs freely from the ring;
   e. the spring being tubular and not cone shaped;
   f. the spring having coils which are spaced apart from each other;
   g. the treble hook comprising a central shank and three curved legs each having a pointed end;
   h. the curved legs not turning back over any portion of the spring when the central shank of the treble hook and the elongated shank share a common central longitudinal axis; and
   i. the spring measured along a straight central longitudinal axis thereof being longer than the treble hook measured along a straight central longitudinal axis of the central shank of the treble hook.

8. The fishing device of claim 3, wherein the spring is fluorescently coated, and the three legs are devoid of fluorescent coating.

\* \* \* \* \*